United States Patent [19]

Aerts et al.

[11] Patent Number: 5,753,756

[45] Date of Patent: May 19, 1998

[54] HIGH-SOLIDS COATING COMPOSITION

[75] Inventors: Armand Aerts, Bekkevoort; Jozeff Huybrechts, Oud-Turnhout, both of Belgium

[73] Assignee: E. I. du Pont de Nemours and Company, Wilmington, Del.

[21] Appl. No.: 654,475

[22] Filed: May 28, 1996

Related U.S. Application Data

[63] Continuation-in-part of Ser. No. 368,944, Jan. 5, 1995, abandoned.

[51] Int. Cl.⁶ .................................................. C08L 63/00
[52] U.S. Cl. .................................. 525/111.5; 525/118
[58] Field of Search ..................... 524/513; 525/110, 525/111.5, 118

[56] References Cited

U.S. PATENT DOCUMENTS

| | | | |
|---|---|---|---|
| 3,558,564 | 1/1971 | Vasta | 260/77.5 |
| 3,644,258 | 2/1972 | Moore et al. | 260/29.6 |
| 3,804,438 | 4/1974 | Humphries et al. | 285/47 |
| 4,113,702 | 9/1978 | Psencik | 528/75 |
| 4,210,702 | 7/1980 | Dalibor | 428/413 |
| 4,322,508 | 3/1982 | Peng et al. | 525/110 |
| 4,390,688 | 6/1983 | Walz et al. | 528/295.3 |
| 4,503,175 | 3/1985 | Houze et al. | 524/39 |
| 4,603,064 | 7/1986 | Kania | 427/407.1 |
| 4,659,778 | 4/1987 | Williams | 525/107 |
| 4,713,427 | 12/1987 | Chattha et al. | 525/518 |
| 4,732,791 | 3/1988 | Blackburn et al. | 427/407.1 |
| 5,098,952 | 3/1992 | Blasko et al. | 525/123 |
| 5,159,047 | 10/1992 | Simms | 528/45 |
| 5,286,782 | 2/1994 | Lamb et al. | 524/507 |

FOREIGN PATENT DOCUMENTS

| | | |
|---|---|---|
| 1 528 802 | 9/1975 | European Pat. Off. . |
| 0 036 975 A3 | 3/1981 | European Pat. Off. . |
| 0 171 847 | 7/1985 | European Pat. Off. . |
| 0 316 874 A2 | 11/1988 | European Pat. Off. . |
| 0 317 184 A2 | 11/1988 | European Pat. Off. . |
| 0 408 858 A1 | 5/1990 | European Pat. Off. . |
| 1 286 451 | 5/1968 | United Kingdom . |
| WO 94/28045 | 12/1994 | WIPO . |

*Primary Examiner*—Jeffrey T. Smith

[57] ABSTRACT

A coating composition useful for a finish for automobiles and trucks in which the film-forming binder comprises a hydroxy-functional (meth)acrylate copolymer derived from comonomers comprising a alkyl-substituted cycloaliphatic (meth)acrylic comonomer and/or alkyl-substituted aromatic vinyl comonomer is disclosed. The composition further comprises a structured multi-hydroxyl oligoester and a crosslinking agent. The composition is characterized by an improved balance of viscosity and dry time.

16 Claims, No Drawings

HIGH-SOLIDS COATING COMPOSITION

CROSS-REFERENCE TO RELATED APPLICATION

This is a continuation-in-part of U.S. application Ser. No. 08/368,944, filed on 5 Jan. 1995, now abandoned.

FIELD OF THE INVENTION

A coating composition comprising a hydroxy-functional (meth)acrylate copolymer derived from comonomers comprising a certain proportion of alkyl-substituted cycloaliphatic (meth)acrylic comonomer and/or alkyl-substituted aromatic vinyl comonomer is disclosed. The composition further comprises a hydroxy-functional oligomer, as described below, which can crosslink with a crosslinking agent to form a thermosetting coating composition.

BACKGROUND OF THE INVENTION

Automobiles and trucks receive exterior finishes for several well known reasons. First, such finishes provide barrier protection against corrosion. Second, consumers prefer an exterior finish having an attractive aesthetic finish, including high gloss and excellent DOI (distinctness of image).

A typical automobile steel panel or substrate has several layers of finishes or coatings. The substrate is typically first coated with an inorganic rust-proofing zinc or iron phosphate layer over which is provided a primer which can be an electrocoated primer or a repair primer. Optionally, a primer surfacer can be applied to provide for better appearance and/or improved adhesion. A pigmented basecoat or colorcoat is next applied over the primer. A typical basecoat or colorcoat comprises a pigment, which can include metallic flakes in the case of a metallic finish. In order to protect and preserve the aesthetic qualities of the finish on the vehicle, it is well known to provide a clear (unpigmented) topcoat over the colored (pigmented) basecoat, so that the basecoat remains unaffected even on prolonged exposure to the environment or weathering.

Automotive coating compositions have, in recent years, been the subject of increasingly demanding regulations regarding the volatile organic content (VOC) of the compositions. Even lower VOC requirements are expected to come into effect in future years. Consequently, various approaches to responding to these present or future regulations are being tried, including the development of aqueous coatings, high-solids coatings, and powder coatings. A problem with high-solids coatings has been, however, that they usually require lower molecular weight film-forming polymers in order to provide compositions having sprayable viscosities. But the use of low molecular weight polymers have resulted in a drop in the drying performance of the coatings when applied to an automotive substrate. The tack time is slower, which would mean that cars would take significantly longer time to paint. A goal has therefore been to develop an improved automotive coating composition in which an increase in the solids content of the composition would not result in a lower dry-time performance.

Many film-forming polymers useful in coating compositions are known in the art. Commonly such polymers are acrylic or methacrylate polymers which are typically linear polymers that cure in the presence of a crosslinking agent. However, compositions containing oligomers are also known. For example, U.S. Pat. No. 4,322,508 (1982) discloses a high-solids paint composition based on a hydroxy-functional oligomer in combination with a hydroxy-functional copolymer and a crosslinking agent capable of reacting with these binders components. The hydroxy-functional oligomer is prepared by esterfication between a carboxylic acid and an epoxide. This patent does not disclose the use of monoepoxyesters in the preparation. The use of epoxyesters in the instant composition allows preparation of low molecular weight oligomers with much better control of molecular weight and functionality.

DE 1528802 (1994) discloses the preparation of polyesters having a narrow molecular weight distribution, which preparation uses monoepoxyesters. U.S. Pat. No. 3,804,438 (1989) describes polyester oligomers prepared via standard polycondensation. The molecular weight ($M_w$) distribution will be broader than oligomers prepared via ring opening polycondensation with negative impact on properties.

GB 1,286,451 A (1968) describes oligomers prepared via ring opening polycondensation. All examples, however, are directed to epoxides, as also mentioned in U.S. Pat. No. 4,322,508. GB 1,528,802 A (1978) describes a two-stage process for making oligomers. No acid-anhydrides are mentioned, however, nor are such oligomers combined, in formulation, with acrylics.

EPO 317,184, EPO 316,874, and U.S. Pat. Nos. 4,713,427 and 4,732,791 describe coating compositions using polyols and epoxy and anhydride binders for crosslinking. U.S. Pat. No. 4,113,702 (1978) describes compositions in which an acid functional polyester of specified viscosity is reacted with an epoxy ester. U.S. Pat. No. 4,659,778 (1978) covers oligomers, as can be employed in the present invention, which oligomers, however, have less than 52 carbon atoms.

Various coating compositions containing copolymers having substituted or branched cycloaliphatic groups of various sizes or numbers of carbon atoms are also known. For example, U.S. Pat. No. 4,603,064 describes coating compositions, for use in clearcoats, based on acrylics prepared via a combination of silane-functional monomers and isobornyl (meth)acrylate. U.S. Pat. No. 3,644,258 discloses the use of tertiaryl butylstyrene monomer in coating compositions. U.S. Pat. No. 5,098,952 covers coating compositions based on a blend of a low glass transition temperature ($T_g$) high-hydroxyl acrylic copolymer with a high $T_g$ low-hydroxyl acrylic copolymer.

None of the above references discloses the combination of such hydroxy-functional oligomers with a copolymer having a minimum amount of a branched or substituted cycloaliphatic (meth)acrylate monomer or substituted aromatic vinyl monomer. Applicants have quite unexpectedly found that the use of such a copolymer with alkyl-substituted cycloaliphatic or alkyl-substituted aromatic groups off the backbone, in combination with a multifunctional hydroxy-functional oligoester, solves the problem of obtaining the necessary balance of solids, reactivity, and physical dry time in a coating composition, which balance cannot be achieved with (meth)acrylate copolymers having only shorter chain alkyl or long chain linear alkyl (meth)acrylate monomer units.

SUMMARY OF THE INVENTION

The present invention is directed to a potentially high-solids coating composition comprising a blend of 25 to 80 percent by weight of binder components and 75 to 20 percent by weight of an organic liquid carrier, wherein the binder comprises the following separate components:

(a) 5 to 50 percent, by weight of the binder, of one or more hydroxy-functional oligoesters, obtained by the reaction of a branched polycarboxylic acid and a monoepoxyester, having at least one hydroxy group on each of at least three separate branches of the oligoester, a polydispersity of less than 2.5, a hydroxy value of between 80 and 280, and a number average molecular weight ($M_n$) between 150 and 3000;

(b) 10 to 90 percent, by weight of the binder, of a hydroxy-functional acrylic or methacrylic copolymer with an $M_n$ between 500 and 15000 having a hydroxy-functional comonomer content between 10 and 50 weight percent of the copolymer and at least 10 percent of comonomers selected from the group consisting of alkyl-substituted cycloaliphatic (meth)acrylic comonomer and/or alkyl-substituted aromatic vinyl comonomers, and combinations thereof, wherein the alkyl-substituted cycloaliphatic group on said comonomers has at least nine carbon atoms and the alkyl-substituted aromatic group on said comonomers has at least ten carbon atoms;

(c) 5 to 30 percent, by weight of the binder, of a crosslinking agent capable of reacting with both components (a) and (b) above in the presence of an effective amount of catalyst; and (d) an effective amount of a curing catalyst.

The present composition is especially useful for finishing the exterior of automobiles and trucks and parts thereof. The present composition, depending on the presence of pigments and other conventional components, can be used as a primer, primer surfacer, basecoat, and/or clearcoat. It is especially advantageous for use in a clearcoat. The claimed composition further includes a substrate having adhered thereto a coating according to the above composition.

The present invention offers several significant advantages. Applicants have found that the combination of the first two binder components (a) and (b) above gave a remarkably good balance of properties at a high solids content. Specifically, the balance of physical (lacquer type) drying and chemical (crosslinking) drying in relation to solids content was significantly better when compared to binder combinations outside the claimed composition. Compositions according to the present invention also show good acid-etch resistance and, with respect to a topcoat, good gloss.

DETAILED DESCRIPTION OF THE INVENTION

The present invention is directed to a coating composition comprising a novel combination of binder components. In general, the total polymeric and oligomeric components of a coating composition are conventionally referred to as the "binder" or "binder solids" and are dissolved, emulsified or otherwise dispersed in a liquid solvent or carrier. The binder solids generally include all the normally solid polymeric components of the composition. Generally, catalysts, pigments, or chemical additives such as stabilizers are not considered part of the binder solids. Non-binder solids other than pigments usually do not amount for more than about 10% by weight of the composition. The coating composition of the present invention suitably contains about 25–80%, more typically 50–70% by weight of the binder, and about 20–75%, more typically 30–50% by weight, of a solvent or carrier.

The present composition suitably comprises about 5 to 50 percent, preferably 10 to 30 percent, based on the weight of the binder, of a hydroxy-functional oligoester. As indicated above, this hydroxy-functional branched oligoester has at least one hydroxy group on each of at least three separate branches of the oligoester, has a polydispersity of less than 2.5, a hydroxy value of between 80 and 280, and a number average molecular weight ($M_n$) between 150 and 3000. Such oligoesters are sometimes referred to as "star" or "dendrite" oligomers because they have a plurality of arms or branches.

This oligoester can be prepared using a monoepoxyester and preferably a monoepoxyester of a branched polycarboxylic acid such as a tertiary fatty acid like Cardura™ E10 (versatic acid $C_{10}$) or Cardura™ E5 (pivalic acid $C_5$), at least one of which is presently commercially available from Shell. Applicants have found that monoepoxyesters give narrower molecular weight distributions, have improved reactivity and, therefore, shorter reaction times with less side products. Oligomers based on monoepoxyesters also can exhibit better outdoor durability than other epoxies. However, the broad scope of the present invention is not limited by any particular method of preparing the components of the composition, since various alternate methods are known in the art, for example, as disclosed in U.S. Pat. No. 4,322,508, hereby incorporated by reference in its entirety.

The hydroxy-functional oligomer can be synthesized by various routes, but preferably by employing a ring-opening polycondensation reaction in which r moles of a multifunctional or s-functional polyol (wherein s is preferably up to four, but at least two) or a blend of polyols, so that the average functionality is at least two, are reacted with up to or less than r×s moles of an anhydride and/or acid anhydride and further with a sufficient amount of a monoepoxyester to convert the acid groups into hydroxyl groups.

Suitable polyols for the above-mentioned synthesis are glycerine, trimethylolpropane, pentaerythritol, neopentyl glycol, ethyleneglycol, and the like. Suitable anhydrides for the above-mentioned synthesis include succinic anhydride, maleic anhydride, phthalic anhydride, hexahydrophthalic anhydride, methylhexahydrophthalic anhydride, and the like.

Suitable acid-anhydrides for the above-mentioned synthesis are trimellitic anhydride, hydrogenated trimellitic anhydride, the Diels-Alder adduct of maleic anhydride with sorbic acid, the hydrogenated Diels-Alder adduct of maleic anhydride and sorbic acid, and the like.

Suitable monoepoxyesters which can be used for the above-mentioned synthesis are the epoxyesters of benzoic acid, acetic acid, privalic acid (Cardura™ E5), versatic acid (Cardura™ E10), isobutyric acid (Cardura™ E4), and the like.

During the synthesis, the ring opening condensation of lactones (e.g., caprolactone) can also be used. The amount of ε-caprolactone as a weight percent of the composition, however, preferably is less than 50 percent. The oligomer should have a functionality of at least 2, and preferably an OH value of 120 to 250 and a number average $M_n$ of less than 2500.

By way of illustration, one structural embodiment of the oligomer, for use in the present invention, can be drawn as follows if the starting polyol is monopentaerythritol.

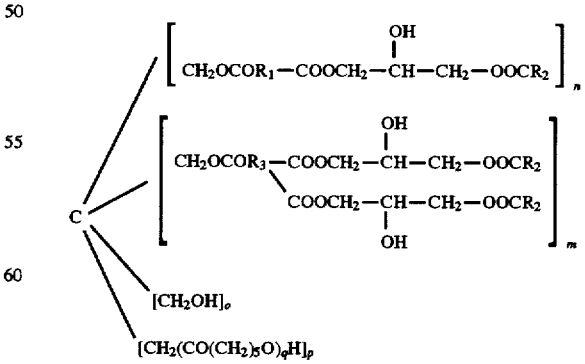

wherein, in this example, n+m+o+p is equal to 4 because it is an example of an oligomer with four branches, although other oligomers employed in the invention can have three branches, as indicated above. In this example, for better properties, each of o and p are independently a maximum of 2 and each of n and m are independently a maximum of 4. The subscript q can be from 1 to 3. In a preferred four-functional embodiment, p=0, o=1, and n=3. For other branched oligomers with at least three branches, o and p should be a maximum of 2. In the above formula, $R_1$ and $R_3$ are independently an aliphatic, aromatic or cycloaliphatic linkage with up to 9 carbon atoms and $R_2$ is an aliphatic, aromatic or cycloaliphatic linkage with up to 18 carbon atoms.

The present composition suitably comprises about 10 to 90 percent, preferably 30 to 70 percent, based on the weight of the binder, of one or more (meth)acrylate copolymers. This copolymer comprises:

(a) 10–50 weight percent, preferably 20–35 percent, by weight of the copolymer, of a hydroxy-functional monomer; and (b) 10–90 weight percent, preferably 15 to weight 60 percent, most preferably 20 to 40 weight percent, of comonomers selected from the group consisting of alkyl-substituted cycloaliphatic (meth)acrylic comonomers, alkyl-substituted aromatic vinyl comonomer and combinations thereof, wherein the alkyl-substituted cycloaliphatic group is at least $C_9$ (has at least nine carbon atoms, preferably 9 to 12) and the alkyl-substituted aromatic vinyl group is at least $C_{10}$ (has at least 10 carbon atoms, preferably 10 to 12).

(c) 0–80 weight percent, preferably 25 to 50 percent, of other copolymerizable comonomers.

Such alkyl-substituted cycloaliphatic acrylate or methacrylates can include, among others, trimethylcyclohexyl methacrylate, t-butyl cyclohexyl methacrylate, isobornyl methacrylate, or combinations thereof.

Preferred aromatic vinyl monomers are alkyl-substituted styrene such as t-butyl styrene. Blends of the above-mentioned comonomers, for example, t-butylstryrene with such monomers as isobornyl-, t-butylcyclohexyl-, or trimethylcyclohexyl-acrylate or methacrylate are also suitable.

The alkyl substitution in the above comonomers can include one or more (preferably 1) alkyl groups each independently having 1 to 6 carbon atoms (preferably 3 to 4 carbon atoms.) The term alkyl-substituted, in this application, is meant to include an aliphatic bridge between carbon atoms on a cycloaliphatic ring. A preferred alkyl-substituted cycloaliphatic monomer, for use in the above-mentioned copolymer, can have a formula as follows:

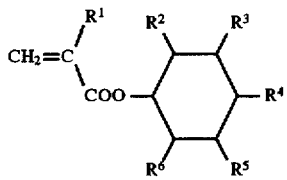

wherein $R^1$ is H or $CH_3$ and $R^2$, $R^3$, $R^4$, $R^5$, and $R^6$ are each independently H, $CH_3$ or $C[CH_3]_3$, and wherein optionally a —$C[CH_3]_2$— bridge can exist in a para position on the ring, and wherein the ring group attached to the COO— group has at least 9 carbon atoms, preferably 9 to 12 carbon atoms, and wherein the $T_g$ of the monomer is preferably greater than 100° C. For example, the reported $T_g$ of homopolymers of isobornyl methacrylate is 110° C., of t-butyl styrene is 110° C., and of t-butyl cyclohexyl methacrylate is 110° C.

The hydroxy-functional copolymer is suitably prepared by conventional free radical induced polymerizations of suitable unsaturated monomers. The copolymer contains 10–50% of hydroxy-functional monomers selected from hydroxyalkyl esters of mono- or di-ethylenically unsaturated carboxylic acids. Ethylenically unsaturated monomers containing hydroxy functionality that can be used in the copolymer include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Further examples are the reaction product of acrylic acid, methacrylic acid, itaconic acid, maleic acid, fumaric acid with monoepoxy compounds such as ethylene oxide, alkylepoxy ethers, alkylepoxyesters, and the like. A hydroxy-functionality can also be obtained from monomer precursors, for example, the epoxy group of a glycidyl methacrylate unit in a polymer. Such an epoxy group can be converted, in a post polymerization reaction with water or a small amount of acid, to a hydroxy group.

Preferably, the balance of the copolymer comprises other (meth)acrylate and/or vinyl monomers, including styrene, methyl styrene, and/or vinyltoluene monomers. By the term "(meth)acrylate" in this application is meant methacrylate, acrylate or combinations thereof. Preferably, the majority of these monomers (greater than 50% by weight) in the balance of the copolymer should be methacrylate or acrylate monomers. For example, alkyl methacrylates having 1–12 carbons in the alkyl group can be used such as methyl methacrylate, ethyl methacrylate, propyl methacrylate, isopropyl methacrylate, iso-butyl or tertiary-butyl methacrylate, pentyl methacrylate, hexyl methacrylate, 2-ethyl-hexyl methacrylate, nonyl methacrylate, lauryl methacrylate and the like or combinations thereof Aryl methacrylates such as benzyl methacrylate also can be used. Half- and diesters of maleic, itaconic, or fumaric acid and combinations thereof can also be used.

The composition of the hydroxy-functional copolymer is such that the hydroxyl value is preferably between 60 and 180, the number average $M_n$ below 4000, and the calculated $T_g$ above 30° C. The copolymer can be prepared using free radical initiated polymerization in solution, for example, as described in U.S. Pat. No. 4,322,508, already incorporated by reference.

The weight ratio of oligomer to (meth)acrylate copolymer is suitably from 5/95 up to 95/5, preferably 80/20 to 20/80, most preferably between 30/70 and 70/30.

The oligomer should have at least two hydroxyl groups per molecule, an OH value of 120 to 250, preferably between 140 and 220, and number average molecular weight of less than 2500.

The (meth)acrylate copolymer should have an OH value of 60 to 180, preferably between 100 and 150, a calculated $T_g$ (using the Fox equation) of at least 40° C., preferably above 50° C., and a number average molecular weight $M_n$ of less than 4000.

The coating composition contains one or more crosslinkers preferably based on polyisocyanates. Many examples of such crosslinkers are commercially available as will be appreciated by those skilled in the coatings art. Various isocyanates employed as crosslinking agents are described in U.S. Pat. No. 4,322,508, incorporated by reference. However, the biuret or cyclotrimer of hexamethylene diisocyanate or isophorone diisocyanate are preferred.

Trifunctional isocyanates can be used, for example, triphenylmethane triisocyanate, 1,3,5-benzene triisocyanate, 2,4, 6-toluene triisocyanate, an adduct of trimethylol and tetramethyl xylene diisocyanate sold under the tradename "Cythane 3160," "Desmodur" N 3390 which is the trimer of hexamethylene diisocyanate, and the like. Optionally, one can use a polyisocyanate acrylic copolymer derived from isocyanatoethyl methacrylate (commercially available as TMI) and the like, as, for example, disclosed in U.S. Pat. No. 4,965,317 (col. 5) hereby incorporated by reference.

As indicated above, the polyisocyanate can optionally be blocked. Examples of suitable blocking agents are those materials which would unblock at elevated temperatures, for example, lower aliphatic alcohols such as methanol, oximes such as methylethyl ketone oxime, and lactams such as epsiloncaprolactam. Blocked isocyanates can be used to form stable one-package systems. Polyfunctional isocyanates with free isocyanate groups can be used to form two-package room temperature curable systems. In these systems, the product and isocyanate curing agent are mixed just prior to their application.

Other film-forming polymers, preferably 0 to 45 percent by weight, based on the weight of the binder, can also be used in conjunction with the above-mentioned components. Other film-forming polymers can be linear or branched and can include acrylics, acrylourethanes, polyesters, polyester urethanes, polyethers, and polyether urethanes that are compatible with the other components of the binder.

The amounts of oligoester, copolymer, curing agent, and catalyst will, of course, vary widely depending upon many factors, among them the specific components of the composition and the intended use of the composition.

In addition, a composition according to the present invention can contain a variety of other optional ingredients, including pigments, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an antioxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The composition can also include conventional formulation additives such as flow control agents, for example, Resiflow® S (polybutylacrylate), BYK™ 320 and 325 (high molecular weight polyacrylates); rheology control agents, such as fumed silica, microgels, and non-aqueous dispersion polymers; water scavengers such as tetrasilicate, trimethyl orthoformate, triethyl orthoformate, and the like.

When the present composition is used as a clearcoat (topcoat) over a pigmented colorcoat (basecoat) to provide a colorcoat/clearcoat finish, small amounts of pigment can be added to the clear coat to provide special color or aesthetic effects such as tinting.

The present composition can be pigmented and used as the colorcoat, monocoat, primer, or primer surfacer. The composition has excellent adhesion to a variety of metallic or non-metallic substrates, such as previously painted substrates, cold rolled steel, phosphatized steel, and steel coated with conventional primers by electrodeposition. The present composition can also be used to coat plastic substrates such as polyester reinforced fiberglass, reaction injection-molded urethanes and partially crystalline polyamides.

When the present coating composition is used as a basecoat, typical pigments that can be added to the composition include the following:

metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition to obtain the present coating compositions.

The coating composition can be applied by conventional techniques such as spraying, electrostatic spraying, dipping, brushing, flowcoating and the like. The preferred technique is spraying. The present composition can be used as an ambient cure, especially for refinish, or at elevated temperature. In OEM applications, the composition is typically baked at 100°–150° C. for about 15–30 minutes to form a coating about 0.1–3.0 mils thick. When the composition is used as a clearcoat, it is applied over the colorcoat which can be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

In the following Procedures and Examples, parts and percentages are on a weight basis unless otherwise indicated. All molecular weights are determined by gel permeation chromatography using a polystyrene standard. Polydispersity is the ratio of weight average molecular weight over number average molecular weight as obtained from gel permeation chromatography using narrow molecular weight polystyrene samples as standard.

Procedure 1 (For Making Component (a))

This Procedure illustrates the preparation of a hydroxy-functional oligomer which would be suitable for use in the claimed composition. A 160.16 g amount of butylacetate, 136 g of monopentaerythritol, and 504 g of methylhexahydrophthalic anhydride are loaded in a glass reactor and heated to reflux until dissolved. Afterwards, 750 g of CE10 (Cardura™ E10-glycidyl ester of versatic acid) are added, followed by 1.39 g of dibutyl tin dilaurate dissolved in 8.61 g of butylacetate. The mixture is further refluxed until the acid value (AV) or acid number (AN), synonymous terms, is below 3. A further 177.33 g of butylacetate are added. The total reaction time is about 3 hours. Exemplary test results were as follows. The hydroxy numbers or values are calculated from the theoretical structure. Polydispersity=1.22.

| Parameter | Value |
| --- | --- |
| Solids | 80.5% |
| Viscosity | X |
| AN | 2.8 |
| $M_n$ | 1190 |
| $M_w$ | 1460 |
| Molar ratio: | |
| monopentaerythritol/methylhexahydrophthalic anhydride/Cardura™ E10 | 1/3/3 |
| OH ≠ theoretical | 161 |

Comparison 1

This Comparison illustrates the preparation of a hydroxy-functional oligomer which, however, is less preferred than the oligomer of Procedure 1 for use in the claimed composition. An oligomer was prepared via conventional polyesterification at 230° C. using 474 g isononanoic acid, 276 g glycerine, 136 g monopentaerythritol and 504 g methylhexahydrophthalic anhydride. The structure can be compared with Example 1 on a molar basis if one uses isononanoic acid as a reference for versatic acid as found in the structure of Cardura™ E10. The mixture was diluted with 108 g of butylacetate. The results were as follows with polydispersity=3.06:

| Parameter | Value |
| --- | --- |
| Solids | 79.5% |
| Viscosity | Y |
| AN | 1.5 |
| $M_n$ | 1550 |
| $M_w$ | 4750 |
| Molar ratio: | |
| monopentaerythritol/methylhexahydrophthalic anhydride/isononanoic acid/glycerine | 1/3/3/3 |
| OH ≠ theoretical | 175 |

The results show a broader $M_w$ distribution compared with Procedure 1 and a less favorable solids/viscosity balance.

Comparison 2

This Comparison illustrates the preparation of a hydroxy-functional oligomer which would be suitable for use in the claimed composition, but which again is less favorable than the oligomer of Procedure 1. Procedure 1 was repeated using 411 g of ethylhexylglycidyl ether (Grilonit 1803) instead of Cardura™ E10 followed by 41 g of butylacetate and 1.05 g of dibutyl tin dilaurate dissolved in 8.95 g of butylacetate. After 8 hours reaction time, the acid value was still 75, although on a molar basis it should be below three. An additional amount of dimethylcyclohexylamine catalyst (135 g) was added as well as 330 g of ethylhexylglycidyl ether. After an additional 16 hours reaction time, the mixture was diluted with 50 g butylacetate. The results were as follows with polydispersity=2.12:

| Parameter | Value |
| --- | --- |
| Solids | 81 |
| Viscosity | D + ½ |
| AN | 11.9 |
| $M_n$ | 750 |
| $M_w$ | 1590 |

| Parameter | Value |
| --- | --- |
| Molar ratio: | |
| monopentaerythritol/methylhexahydrophthalic anhydride/ethylhexylglycidyl ether | 1/3/3 |
| OH ≠ theoretical | 214 |

This Comparison shows that the use of epoxyesters is more favorable than the use of epoxy ethers, as mentioned previously.

Comparison 3

This Comparison illustrates the preparation of a hydroxy-functional oligomer which would be suitable for use in the claimed composition, but which is less preferred than Procedure 1. Procedure 1 was repeated but using 546 g of cyclododecane epoxide (CDE) followed by 47 g of butylacetate and 1.49 g of butylacetate dissolved in 8.51 g butylacetate. Although the AN should be low on a molar basis, after 16 hours reflux it remained at 115. The results were as follows with polydispersity=3.44:

| Parameter | Value |
| --- | --- |
| Solids | 80.5 |
| Viscosity | U – |
| AN | 115 |
| $M_n$ | 180 |
| $M_w$ | 620 |
| Molar ratio: | |
| monopentaerythritol/ethylhexahydrophthalic anhydride/cyclododecane epoxide | 1/3/3 |
| OH ≠ theoretical | 214 |

The $M_w$ is lower than theoretically calculated. The molecular weight distribution was bimodal showing side reactions.

Procedure 2

This Procedure illustrates the preparation of a preferred hydroxy-functional oligomer which would be suitable for use in the claimed composition. Procedure 1 was followed using 115.91 g of butylacetate, 136 g of monopentaerythritol and 336 g of methylhexahydrophthalic anhydride in the reactor followed by 500 g of Cardura™ E10 and 0.97 g dibutyl tin dilaurate in 9.03 g of butylacetate. The batch was refluxed till AN>3 and further diluted with 117.09 g of butylacetate. Tests results were as follows with polydispersity=1.27:

| Parameter | Value |
| --- | --- |
| Solids | 82% |
| Viscosity | X + ½ |
| AN | 3 |
| $M_n$ | 1200 |
| $M_w$ | 1520 |
| Molar ratio: | |
| monopentaerythritol/methylhexahydrophthalic anhydride/Cardura™ E10 | 1/2/2 |
| OH ≠ theo | 231 |

Procedure 3

This Procedure illustrates the preparation of another hydroxy-functional oligomer which would be suitable for use in the claimed composition. The oligomer solution of Procedure 2, in the amount of 1215 g, is further refluxed for 4 hours with 114 g of ε-caprolactone and 10 g of butylacetate. The solution is further diluted with 18.5 g of butylacetate. The test results were as follows with polydispersity=1.32:

| Parameter | Value |
| --- | --- |
| Solids | 82.2% |
| Viscosity | W |
| AN | 2.9 |
| $M_n$ | 1100 |
| $M_w$ | 1450 |
| free ε-caprolactone left | none |
| Molar ratio: | |
| monopentaerythritol/methylhexahydrophthalic anhydride/Cardura ™ E10/ε-caprolactone | 1/2/2/1 |
| OH ≠ theoretical | 207 |

Procedure 4

This Procedure illustrates the preparation of another hydroxy-functional oligomer which would be suitable for use in the claimed composition. All together 1100 g of methoxyether of propylene glycol acetate, 136 g of monopentaerythritol and 768 g of trimellitic anhydride are refluxed in a glass reactor until dissolved. A further 0.9 g of dimethylcyclohexylamine dissolved in 4.1 g methoxyether of propylene glycol acetate are added and refluxed for 2 hours. Subsequently, 2000 g of Cardura™ E10 were added and the mixture further refluxed until the AN was below 10 after adding an additional 2 grams of dimethylcyclohexylamine in 3 g of methoxyether of propylene glycol acetate. At the end, another 454 g of methoxyether of propylene glycol acetate were added. The total reaction time was 5 hours. The results were as follows with polydispersity=2.3:

| Parameter | Value |
| --- | --- |
| Solids | 66.3% |
| Viscosity | N + |
| AN | 6.9 |
| $M_n$ | 1000 |
| $M_w$ | 2300 |
| Molar ratio: | |
| monopentaerythritol/trimellitic anhydride/Cardura ™ E10 | 1/4/8 |
| OH ≠ theoretical | 155 |

Comparison 4

This Comparison illustrates the preparation of a hydroxy-functional oligomer which would not be suitable for use in the claimed composition. Procedure 4 was repeated, however, adding 1568 g of ethylhexylglycidyl ether (Grilonit 1807) followed by 1.6 g of dimethylcyclohexylamine in 3.4 g of methoxyether of propylene glycol acetate. After 24 hours reaction time and adding extra amount of up to 1.6 g of dimethylcyclohexylamine catalyst, the AN remained 43. An additional amount of 457 g of ethylhexylglycidyl ether were added with an extra 6 hours of refluxing and thinning with 221 g of methoxyether of propylene glycol acetate. The molecular weight distribution of the final reaction product was much broader than Procedure 4, showing more side reactions of the ethylhexylglycidyl ether. The results were as follows with polydispersity=4.29:

| Parameter | Value |
| --- | --- |
| Solids | 64.6% |
| Viscosity | DT |
| AN | 0.5 |
| $M_n$ | 700 |
| $M_w$ | 3000 |
| Molar ratio: | |
| monopentaerythritol/trimellitic anhydride/ethylhexylglycidyl ether | 1/4/8 |
| OH ≠ theoretical | 182 |

Procedure 5

This Procedure illustrates the preparation of another hydroxy-functional oligomer which would be suitable for use in the claimed composition. All together, 688 g of butylacetate, 136 g of monopentaerythritol and 792 g of hydrogenated trimellitic anhydride were refluxed until dissolved. Further were added 2000 g of Cardura™ E10 followed by 2.93 g of dibutyl tin dilaurate in 7.07 g of butylacetate, and the mixture was refluxed until the AN was below 3. Finally, 34 g of butylacetate were added. The results were as follows with polydispersity=1.71:

| Parameter | Value |
| --- | --- |
| Solids | 81% |
| Viscosity | Z 2 |
| AN | 2.7 |
| $M_n$ | 1960 |
| $M_w$ | 3360 |
| Molar ratio: | |
| Monopentaerythritol/hydrogenated trimellitic anhydride/Cardura ™ E10 | 1/4/8 |
| OH ≠ theoretical | 153 |

Procedure 6

This Procedure illustrates the preparation of another hydroxy-functional oligomer which would be suitable for use in the claimed composition. Procedure 5 was repeated using 160 g of butylacetate, 136 g of monopentaerythritol and 462 g of hexahydrophthalic anhydride. Further, 483 g of Cardura™ E5 followed by 48 g of butylacetate and 1.07 g dibutyltinddilaurate were dissolved in 8.93 g of butylacetate, and refluxed until the AN was lower than 3. The mixture was diluted further with 61 g of butylacetate. The results were as follows with polydispersity=1.39:

| Parameter | Value |
| --- | --- |
| Solids | 81.7% |
| Viscosity | Z 1 – ½ |
| AN | 0.4 |
| $M_n$ | 980 |
| $M_w$ | 1360 |
| Molar ratio: | |
| Monopentaerythritol/hexahydrophthalic anhydride/Cardura ™ E5 | 1/3/3 |
| OH ≠ theoretical | 208 |

Procedure 7

This Procedure illustrates the preparation of another hydroxy-functional oligomer which would be suitable for use in the claimed composition. Procedure 5 was repeated using 248 g butylacetate, 444 g of phthalic anhydride, 134 g of trimethylolpropane and further using 750 g of Cardura™ E10 and 1.33 g of dibutyl tin dilaurate in 8.57 g of butylacetate. Finally, the oligomer was diluted using 311 g of butylacetate (refluxing until the AN was below 10). The results were as follows with polydispersity=1.32:

| Parameter | Value |
|---|---|
| Solids | 72.3 |
| Viscosity | F + ⅓ |
| AN | 7.3 |
| $M_n$ | 1020 |
| $M_w$ | 1350 |
| Molar ratio: | |
| Trimethylolpropane/phthalic anhydride/Cardura ™ E10 | 1/3/3 |
| OH ≠ theoretical | 127 |

Procedure 8

This Procedure illustrates the preparation of another hydroxy-functional oligomer which would be suitable for use in the claimed composition. This example illustrates, for reference, a linear oligomer with an non-theoretical OH (OH Value) below 120. Procedure 5 was repeated using 160 g of butylacetate, 104 g of neopentylglycol, 672 g of methylhexahydrophthalic anhydride, 1000 g of Cardura™ E10, and 1.78 g dibutyl tin dilaurate in 8.22 g of butylacetate. The reaction mixture was refluxed until the AN was below 3, and then the mixture was diluted with 274 g of butylacetate. The results were as follows with polydispersity=1.47:

| Parameter | Value |
|---|---|
| Solids | 80.1% |
| Viscosity | U + 1/3 |
| AN | 2.8 |
| $M_n$ | 1200 |
| $M_w$ | 1760 |
| Molar ratio: | |
| Monopentaerythritol/methylhexahydrophthalic Anhydride/Cardura ™ E10 | |
| OH ≠ theoretical | 63 |

Procedure 9

This Procedure illustrates the preparation of another hydroxy-functional oligomer which would be suitable for use in the claimed composition. Procedure 5 was repeated using 160 g of butylacetate, 168 g of methylhexahydrophthalic anhydride, 296 g of phthalic anhydride, and 136 g monopentaerythritol. Further were added 750 g of Cardura™ E10 with 1.35 g dibutyl tin dilaurate in 8.65 g of butylacetate. The mixture was refluxed until the AN was below 3 and further tinned with 167.5 g of butylacetate. The results were as follows with polydispersity=1.41:

| Parameter | Value |
|---|---|
| Solids | 81.9% |
| Viscosity | Y |
| AN | 1.3 |
| $M_n$ | 1160 |
| $M_w$ | 1640 |
| Molar ratio: | |
| Monopentaerythritol/methylhexahydrophthalic Anhydride/Cardura ™ E10 | 1/1/2/3 |
| OH ≠ theoretical | 66 |

Comparison 5

This Comparison illustrates the preparation of another hydroxy-functional oligomer which would not be suitable for use in the claimed composition. An oligomer was prepared via conventional polyesterification at 230° C. using 474 g of isononanoic acid, 276 g of glycerine, 136 g of monopentaerythritol, 168 g of methylhexahydrophthalic anhydride and 296 g of phthalic anhydride. The structure can be compared on a molar basis with the structure of the oligomer of Procedure 4 using isononanoic acid as a reference for the versatic acid as found chemically in the structure of Cardura™ E10. The mixture was diluted with 315.5 g of butylacetate after reaching an AN below 3. The results were as follows with polydispersity=3.14:

| Parameter | Value |
|---|---|
| Solids | 81.2 |
| Viscosity | Z2 – ⅓ |
| AN | 0.9 |
| $M_n$ | 1580 |
| $M_w$ | 4970 |
| Molar ratio: | |
| Monopentaerythritol/methylhexahydrophthalic Anhydride/phthalic anhydride/isononanoic acid/glycerine | 1/1/2/3/3 |
| OH ≠ theoretical | 166 |

The results show a less favorable solids/viscosity relation due to a broad $M_w$ distribution when using a standard polyesterification reaction.

Comparison 6

This Comparison illustrates the preparation of another hydroxy-functional oligomer which would not be suitable for use in the claimed 15 composition, one with more than 50% ε-caprolactone in which 66.34 g of ε-caprolactone were heated with 33.52 g of 1,4-cyclohexanedimethanol dissolved in 0.133 g of xylene at 160° C. for 4 hours. The results were as follows with polydispersity=1.29; no epoxyester in structure; and functionality of 2:

| Parameter | Value |
|---|---|
| Solids | 99.7% |
| Viscosity | U + ½ |
| AN | 0.8 |
| $M_n$ | 630 |
| $M_w$ | 810 |
| % free ε-caprolactone | 0.15 |
| Molar ratio: | |
| 1,4-cyclohexanedimethanol/ε-caprolactone | 1/2.5 |
| OH ≠ theoretical | 162 |
| Weight % ε-caprolactone in composition | ±66% |

Procedure 10

This Procedure illustrates the preparation of another hydroxy-functional oligomer which would be suitable for use in the claimed composition. Procedure 5 was repeated using 140 g of butylacetate, 136 g of monopentaerythritol, 672 g of methylhexahydrophthalic anhydride, 600 g Cardura™ E4 and 0.3 g of dibutyl tin dilaurate dissolved in 3.7 g of butylacetate. The mixture was refluxed until the AN was in the range of 5–10. Subsequently, 108 g of butylacetate were added. The results were as follows with polydispersity=1.73:

| Parameter | Value |
|---|---|
| Solids | 77.3 |
| Viscosity | X + ⅓ |
| AN | 6.9 |
| $M_n$ | 1100 |
| $M_w$ | 1900 |

| Parameter | Value |
|---|---|
| Molar ratio: | |
| Monopentaerythritol/methylhexahydrophthalic Anhydride/Cardura ™ E4 | 1/4/4 |
| OH ≠ theoretical | 159 |

Procedure 11 (For Making Component (1))

This Procedure illustrates the preparation of a copolymer derived from comonomers comprising a branched cycloaliphatic (meth)acrylic monomer. In a reactor equipped with stirrer, condensor, thermometer and feed vessel were added 18 parts of butylacetate which was heated to reflux. A blend of 37.8 parts isobornylmethacrylate, 19.6 parts 2-hydroxyethylmethacrylate, 12.6 parts 2-ethylhexylmethacrylate, 5.5 parts t-butylperoxy-2-ethylhexanoate and 18.2 parts butylacetate were fed to the reactor over 6 hours. Afterwards, 1 part of butylacetate was used as rinse and added to the reactor. The mixture was refluxed for a further 20 minutes. Then, 0.5 parts t-butylperoxy-2-ethylhexanoate was dissolved in 1.5 parts butylacetate and added over 30 minutes followed by 1 part butylacetate as rinse. The mixture was refluxed for another 30 minutes and 1 part of butylacetate was added. The test results were as follows:

| Parameter | Value |
|---|---|
| Solids | 60.6 |
| Viscosity | T + ⅓ |
| AN | 1.9 |
| $M_n$ | 2700 |
| $M_w$ | 5300 |
| Composition (wt): | |
| Isobornylmethacrylate/2-hydroxyethylmethacrylate/2-ethylhexylmethacrylate | 54/28/18 |
| Calculated $T_g$ | 35° C. |
| OH ≠ theoretical | 121 |

Comparison 7

Procedure 11 was followed except that isobornylmethacrylate was replaced with i-butylmethacrylate. The test results were as follows:

| Parameter | Value |
|---|---|
| Solids | 59.8 |
| Viscosity | T + ½ |
| AN | 18 |
| $M_n$ | 2800 |
| $M_w$ | 6900 |
| Composition (wt): | |
| Iso-butylmethacrylate/2-hydroxyethylmethacrylate/2-ethylhexylmethacrylate | 54/28/18 |
| Calculated $T_g$ | 35° C. |
| OH ≠ theoretical | 121 |

Comparison 8

Procedure 11 was followed except that isobornylmethacrylate was replaced with t-butylmethacrylate. The results were as follows:

| Parameter | Value |
|---|---|
| Solids | 58.9 |
| Viscosity | U - ¼ |
| AN | 4.7 |
| $M_n$ | 2600 |
| $M_w$ | 5900 |
| Composition (wt): | |
| Tertiary-butylmethacrylate/2-hydroxyethylmethacrylate/2-ethylhexylmethacrylate | 54/28/18 |
| Calculated $T_g$ | 66° C. |
| OH ≠ theoretical | 121 |

Comparison 9

Procedure 11 was followed except that isobornylmethacrylate was replaced with methylmethacrylate. The test results were as follows:

| Parameter | Value |
|---|---|
| Solids | 61 |
| Viscosity | Z 5 |
| AN | 1.9 |
| $M_n$ | 3300 |
| $M_w$ | 7400 |
| Composition (wt): | |
| Methylmethacrylyate/2-hydroxyethylmethacrylate/2-ethylhexylmethacrylate | 54/28/18 |
| Calculated $T_g$ | 64° C. |
| OH ≠ theoretical | 121 |

Procedure 12

Procedure 11 was followed except that isobornylmethacrylate was replaced with t-butylstyrene. The test results were as follows:

| Parameter | Value |
|---|---|
| Solids | 61.8 |
| Viscosity | V |
| AN | 0.6 |
| $M_n$ | 2500 |
| $M_w$ | 6300 |
| Composition (wt): | |
| Tertiary-butylstyrene/2-hydroxyethylmethacrylate/2-ethylhexylmethacrylate | 54/28/18 |
| Calculated $T_g$ | 75° C. |
| OH ≠ theoretical | 121 |

Comparison 10

Procedure 11 was followed except that isobornylmethacrylate was replaced with styrene.

| Parameters | Value |
|---|---|
| Solids | 61.1 |
| Viscosity | X + ⅓ |
| AN | 1.9 |
| $M_n$ | 3400 |
| $M_w$ | 8000 |
| Composition (wt): | |
| Styrene/2-hydroxyethylmethacrylate/2-ethylhexylmethacrylate | 54/28/18 |
| Calculated $T_g$ | 62° C. |
| OH ≠ theoretical | 121 |

Procedure 13

Procedure 11 was repeated except that 18 parts of amylacetate were loaded in the reactor. A mixture of 21 parts styrene, 21 parts isobornylmethacrylate, 15.4 parts 2-hydroxyethyl methacrylate, 1.8 parts acrylic acid, 9.8 parts Cardura™ E10, 3.5 parts t-butylperoxy-3,5,5-trimethylhexanoate and 3.5 parts amylacetate were fed to the reactor over 5 hours. A one part amount of amylacetate was used to rinse, and the reactor mixture held for 20 minutes at reflux. Further added were 0.3 parts t-butylperoxy-3,5,5-trimethylhexanoate in 1.7 parts amylacetate over 30 minutes, followed by a 1 part amylacetate rinse. The mixture was then refluxed for another 60 minutes. The batch was finally Finned with 17.6 parts butylacetate. The results were as follows:

| Parameter | Value |
| --- | --- |
| Solids | 62.2 |
| Viscosity | V + ⅓ |
| AN | 6.7 |
| $M_n$ | 2500 |
| $M_w$ | 5400 |
| Composition (wt): | |
| Isobornylmethacrylate/styrene/2-hydroxy-ethylmethacrylate/acrylic acid/Cardura ™ E10 | 30/30/22/4/14 |
| Calculated $T_g$ | 62° C. |
| OH ≠ theoretical | 126 |

The reaction product of acrylic acid and Cardura™ E5 (monoepoxy ester of pivalic acid) was obtained during the synthesis and has a $T_g$ for calculation of –25° C.

Procedure 14

Procedure 13 was repeated with styrene replaced by t-butylstyrene and isobornylmethacrylate replaced by isobutylmethacrylate.

| Parameter | Value |
| --- | --- |
| Solids | 60.7 |
| Viscosity | H – ¼ |
| AN | 5.8 |
| $M_n$ | 1900 |
| $M_w$ | 4200 |
| Composition (wt): | |
| t-butylstyrene/i-butylmethacrylate/2-hydroxyethylmethacrylate/acrylic acid/Cardura ™ E10 | 30/30/22/4/14 |
| Calculated $T_g$ | 50° C. |
| OH ≠ theoretical | 126 |

Procedure 15

Procedure 11 was repeated with 37.8 parts isobornylmethacrylate replaced by 24.50 parts of styrene and 19 parts of isobornylmethacrylate. The results were as follows:

| Parameter | Value |
| --- | --- |
| Solids | 62.4 |
| Viscosity | Y |
| AN | 2.6 |
| $M_n$ | 3200 |
| $M_w$ | 6700 |
| Composition (wt): | |
| Isobornylmethacrylate/styrene/2-hydroxyethylmethacrylate/2-ethylhexylmethacrylate | 19/35/28/18 |
| Calculated $T_g$ | 64° C. |
| OH ≠ theoretical | 121 |

Procedure 16

Procedure 11 was repeated with 39.9 parts isobornylmethacrylate, 17.5 parts 2-hydroxyethylmethacrylate, 3.78 parts acrylic acid, 8.82 parts Cardura™ E5, 4.7 parts t-butylperoxy-2-ethylhexanoate and 2.3 parts of butylacetate in the first feed. At the end, the batch was thinned with 16.7 parts of butylacetate. The results were as follows:

| Parameter | Value |
| --- | --- |
| Solids | 59% |
| Viscosity | X |
| AN | 8.9 |
| $M_n$ | 2900 |
| $M_w$ | 7000 |
| Composition (wt): | |
| Isobornylmethacrylate/2-hydroxyethyl-methacrylate/acrylic acid/Cardura ™ E5 | 57/25/5.4/12.6 |
| Calculated $T_g$ | 71° C. |
| OH ≠ theoretical | 150 |

The reaction product of acrylic acid and Cardura™ E5 was obtained during the synthesis and has a $T_g$ for calculation of +3° C.

Procedure 17

Procedure 11 was repeated using 12 parts Solvesso™ 100 solvent in the reactor. Styrene in the amount of 16.2 parts, 162 parts of isobornylmethacrylate, 16.8 parts of 2-hydroxyethylmethacrylate, 10.8 parts of 2-ethylhexylmethacrylate, 0.8 parts of DBTP and 6.2 parts Solvesso™ 100 solvent were fed to the refluxing solvent over 5 hours. An additional one part of Solvesso™ 100 solvent was added as a rinse. The reaction mixture was held for 1 hour and further thinned down with 20 parts of butylacetate. The results were as follows:

| Parameter | Value |
| --- | --- |
| Solids | 61.1% |
| Viscosity | g + ⅓ |
| AN | 2.1 |
| $M_n$ | 1500 |
| $M_w$ | 3400 |
| Composition (wt): | |
| Isobornylmethacrylate/2-hydroxyethylmethacrylate/2-ethylhexylmethacrylate | 27/28/18 |
| Calculated $T_g$ | 65° C. |
| OH ≠ theoretical | 120 |

Procedure 18

Procedure 11 was repeated, however, replacing isobornylmethacrylate with t-butylcyclohexylmethacrylate. The results were as follows:

| Parameter | Value |
| --- | --- |
| Solids | 61.8 |
| Viscosity | X |
| AN | 2.4 |
| $M_n$ | 3400 |
| $M_w$ | 8300 |
| Composition (wt): | |
| Tertiary-butylcyclohexylmethacrylate/2-hydroxyethylmethacrylate/2-ethylhexylmethacrylate | 54/28/18 |
| Calculated $T_g$ | 66° C. |
| OH ≠ theoretical | 120 |

EXAMPLE 1

A red solid color paint is formulated by blending the following constituents:

Component

Methacrylate copolymer (from Procedure 11) in the amount of 24.37 parts.

Polyester oligomer (from Procedure 1) in the amount of 3.71 parts.

Red dispersion, in the amount of 20.57 parts comprising: 6.48% of pigment CINQUASIA RED RT-333-D (Ciba-Geigy), 30.08% of a hydroxy-functional acrylic copolymer with aminofunctional groups having a weight average molecular weight of 15000–20000, and 33% organic solvent.

Orange dispersion, in the amount of 17.58 parts comprising: 48.5% of pigment Sicomin Rot L-3235-S (BASF), 18.5% of a hydroxy-functional copolymer with aminofunctional groups having a weight average molecular weight of 15000–20000, and 33% organic solvent.

Additives in the amount of 0.83 parts comprising: mar and slip silicones, UV-protection additives, accelerator catalyst.

Organic solvents in the amount of 13.85 parts comprising solvents common to the art.

Isocyanate resin in the amount of 19.09 parts comprising: polyisocyanate cyclotrimer, DES N 3390 from Bayer.

The VOC of the resulting paint is 480 g/L at spray viscosity (22 sec DIN 4 cup). The physical drying properties are tested in two different ways. For dust free time, the paint is spray applied on top of a standard primer at a dry film thickness of 2.5–3 mils. At appropriate time intervals, the surface is touched slightly by cotton fibers. The paint is considered dust free if no cotton fibers are retained anymore at the paint surface. For tack free time, the paint is spray applied on top of a standard primer at a dry film thickness of 2.5–3 mils. At appropriate time intervals, a paper is put on the surface of the paint. On top of the paper, a standard weight of 50 g is place. After 10 seconds, the weight is removed and the panel is turned upside down. If the paper falls within 10 seconds, the paint is considered tack-free. The results were as follows:

| VOC | 480 g/L |
| --- | --- |
| Dust-free time | 42 minutes |
| Tack-free time | 145 minutes |

COMPARATIVE EXAMPLE A

The procedure of Example 1 was followed, except that the methacrylate copolymer was replaced with the methacrylate copolymer of Comparison 7. The results were as follows:

| VOC | 504 g/L |
| --- | --- |
| Dust-free time | 51 minutes |
| Tack-free time | 240 minutes |

COMPARATIVE EXAMPLE B

The procedure of Example 1 was followed, except that the methacrylate copolymer was replaced with the methacrylate copolymer of Comparison 8. The results were as follows:

| VOC | 504 g/L |
| --- | --- |
| Dust-free time | 48 minutes |
| Tack-free time | 240 minutes |

COMPARATIVE EXAMPLE C

The procedure of Example 1 was followed, except that the methacrylate copolymer was replaced with the methacrylate copolymer of Comparison 9. When formulated in a red topcoat, a totally unacceptable solids/viscosity balance was reached. At spray viscosity (22 sec DIN 4 cup), the VOC is 526 g/L.

EXAMPLE 2

The procedure of Example 1 was followed, except that the methacrylate copolymer was replaced with the methacrylate copolymer of Procedure 12. The results were as follows:

| VOC | 480 g/L |
| --- | --- |
| Dust-free time | 43 minutes |
| Tack-free time | 150 minutes |

The results for Examples 1 and 2 versus Comparison A, B and C show lower VOC and better drying (shorter tack-free time) for the compositions of this invention.

EXAMPLES 3 TO 6 AND COMPARATIVE EXAMPLE D

A number of clear coats were formulated with increasing amount of oligomer by blending the following constituents:

Component:

Methacrylate copolymer (from Procedure 13)

Polyester oligomer (from Procedure 1)

Additives: mar and slip silicones, UV-protection additives, accelerator catalysts.

Organic solvents: common to the art.

Isocyanate resin: polyisocyanate cyclotrimer, DES N 3390 from Bayer.

The results were as follows:

| | Parts by Weight | | | | |
| --- | --- | --- | --- | --- | --- |
| Component | Comparison D | Example 3 | Example 4 | Example 5 | Example 6 |
| Methacrylate copolymer | 53.00 | 44.28 | 33.94 | 23.84 | 12.26 |
| Polyester oligomer | — | 8.60 | 17.53 | 27.71 | 38.03 |
| Additives | 1.96 | 2.07 | 2.11 | 2.22 | 2.28 |
| Organic solvents | 28.41 | 27.10 | 26.56 | 24.69 | 24.30 |
| Isocyanate resin | 16.63 | 18.06 | 19.86 | 21.54 | 23.13 |

Applied Test Methods (1) Dust free time: as described with topcoat Example 1.

(2) Tack-free time: as described with topcoat Example 1.

(3) Tape print resistance: a piece of masking tape is applied on the paint film using moderate pressure and rolled over the masking tape with a 2 kg weight. The masking tape is removed after 5 minutes. After waiting 15 minutes, the film is checked for masking tape imprint.

The test results were as follows:

| Clear Coat | Binder Composition Acrylic/ Oligomer | VOC g/L | Tapeprint after 5 hrs | Dust-free time (min) | Tack-free time (min) |
|---|---|---|---|---|---|
| D | 100/0 | 498 | very poor | 20 | 180 |
| 3 | 80/20 | 473 | poor | 24 | 210 |
| 4 | 60/40 | 452 | fair–good | 28 | 220 |
| 5 | 40/60 | 420 | good | 29 | 220 |
| 6 | 20/80 | 397 | good–very good | 31 | 240 |

Out of these results, the following conclusions can be drawn. The presence of the polyester oligomer is important for VOC-reasons. The increased oligomer resulted in better VOC-values. The oligomer had only a slight negative influence on physical drying, as expressed by dust-free times and tack-free times. The oligomer had a strong positive influence on crosslink density as expressed by tape print resistance results. The compositions of this invention demonstrate improved VOC and have good drying (dust, tack-free) and improved tapeprint drying.

We claim:

1. A composition useful as a coating composition comprising 25 to 80 percent by weight of binder components (a) to (d), the balance being catalyst (e) and organic liquid carrier, wherein the binder comprises the following separate components:

(a) 5 to 50 percent, by weight of the binder, of one or more hydroxy-functional oligoesters, obtained by the reaction of a branched polycarboxylic acid and a monoepoxyester, having at least one hydroxy group on each of at least three separate branches of the oligoester, a polydispersity of less than 2.5, a hydroxy value of between 80 and 280, and a number average molecular weight ($M_n$) between 150 and 3000;

(b) 10 to 90 percent, by weight of the binder, of a hydroxy functional acrylic or methacrylic copolymer with an $M_n$ between 500 and 15000 having a hydroxy-functional comonomer content between 10 and 50 weight percent of the copolymer and at least 10 percent of comonomers selected from the group consisting of alkyl-substituted cycloaliphatic (meth)acrylic comonomer and/or alkyl-substituted aromatic vinyl comonomers, and combinations thereof, wherein the alkyl-substituted cycloaliphatic group on said comonomers has at least nine carbon atoms and the alkyl-substituted aromatic group on said comonomers has at least ten carbon atoms;

(c) 5 to 30 percent, by weight of the binder, of a crosslinking agent capable of reacting with both components (a) and (b) above in the presence of an effective amount of catalyst; (d) 0 to 45 percent, by weight of binder, of a member selected from the group consisting of acrylic, acrylourethane, polyester, polyester urethane, polyether, and polyether urethane; and (e) an effective amount of a curing catalyst.

2. The composition of claim 1, wherein the hydroxy-functional oligomer is the product of a ring-opening polycondensation reaction in which a multifunctional polyol is reacted with an anhydride or acid anhydride and further with an epoxyester.

3. The composition of claim 1, wherein the crosslinking agent is a polyisocyanate compound.

4. The composition of claim 1, wherein the hydroxy-functional oligoester is the reaction of a monoepoxyester and a polycarboxylic acid.

5. The composition of claim 1, wherein the hydroxy-functional oligoester has the following formula:

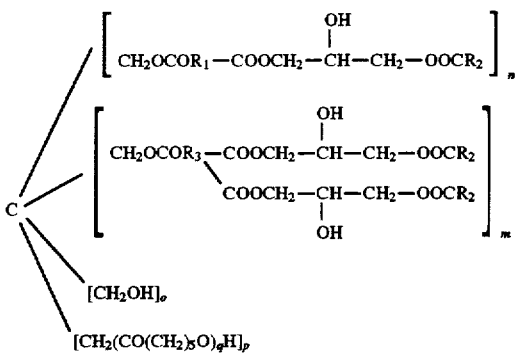

wherein n+m+o+p is equal to 4, o and p are each a maximum of 2, q is from 1 to 3, and $R_1$ and $R_3$ are independently an aliphatic, aromatic or cycloaliphatic linkage with up to 9 carbon atoms and $R_2$ is an aliphatic, aromatic or cycloaliphatic linkage with up to 18 carbon atoms.

6. The composition of claim 5 wherein o=1 and p=0.

7. The composition of claim 6 wherein n=3 and m=0.

8. The composition of claim 1, wherein the alkyl-substituted cycloaliphatic (meth)acrylic comonomer, the alkyl-substituted aromatic vinyl comonomer, or both, comprise at least 20 percent by weight of the copolymer.

9. The composition of claim 1, wherein the alkyl-substituted cycloaliphatic or aromatic group has not more than 12 carbon atoms.

10. The composition of claim 1, wherein the alkyl-substituted cycloaliphatic (meth)acrylic comonomer and alkyl-substituted aromatic vinyl comonomers are selected from the group consisting of isobornyl, t-butyl cyclohexyl, or 3,5,5-trimethylcyclohexyl (meth)acrylate, t-butyl styrene and combinations thereof.

11. The composition of claim 1, wherein the alkyl-substituted cycloaliphatic (meth)acrylic comonomer and/or alkyl-substituted aromatic vinyl comonomer content is at least 25 percent by weight of the copolymer.

12. The composition of claim 1, wherein the ratio of the hydroxy-functional oligoester to the copolymer is between 30:70 to 70:30.

13. The composition of claim 1, wherein the hydroxy-functional oligoester has an OH value of 120 to 250 and a number average molecular weight of less than 2500.

14. The composition of claim 1, wherein the hydroxy-functional copolymer has an OH value of 60 to 180, a calculated $T_g$ of at least 40° C., and a number average molecular weight of less that 4000.

15. A metal or plastic substrate coated with the composition of claim 1.

16. A process of coating an automotive substrate, comprising spraying the coating composition of claim 1 on the automotive substrate.

* * * * *